United States Patent Office 3,357,539
Patented Dec. 12, 1967

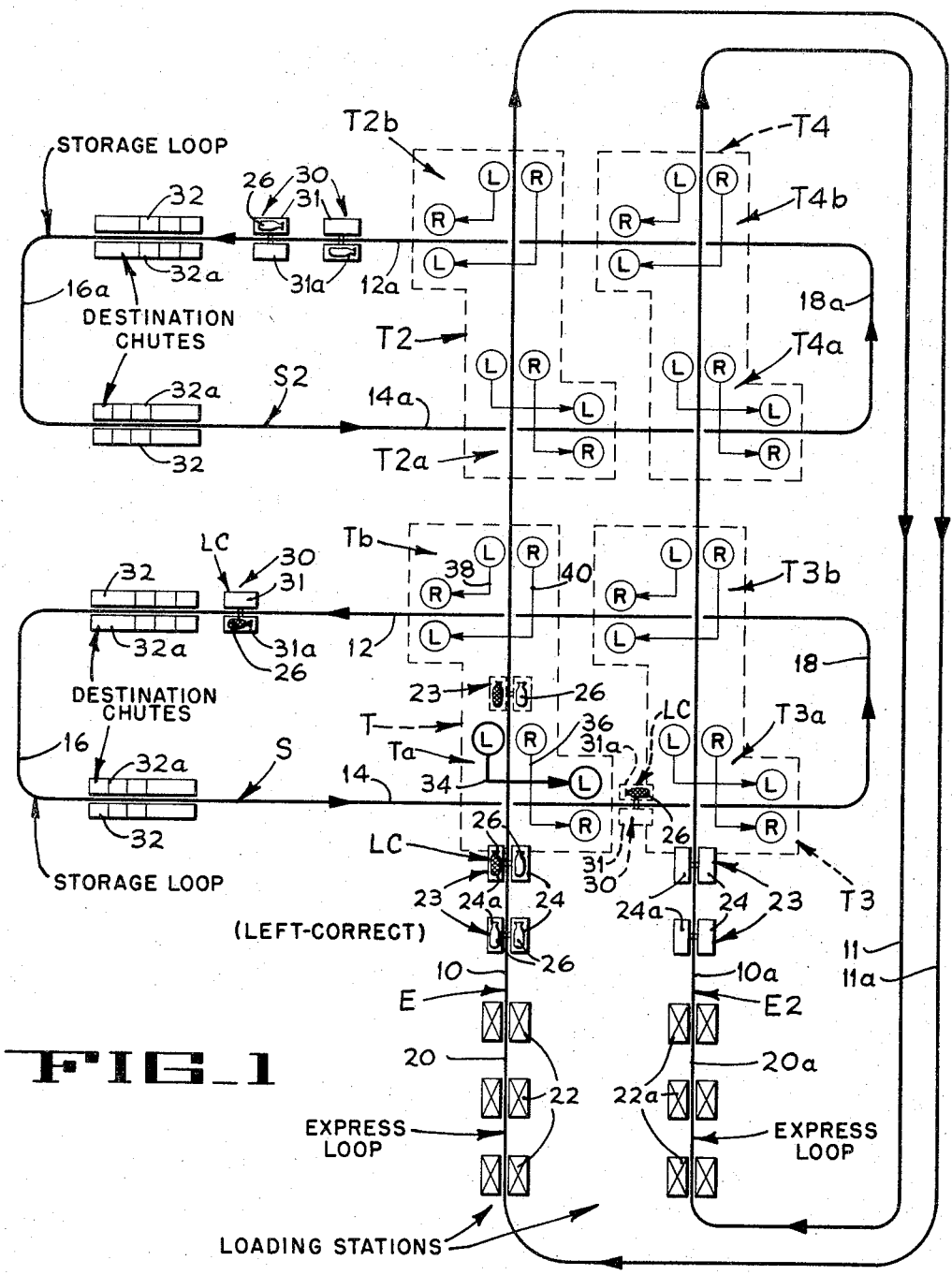
FIG_1

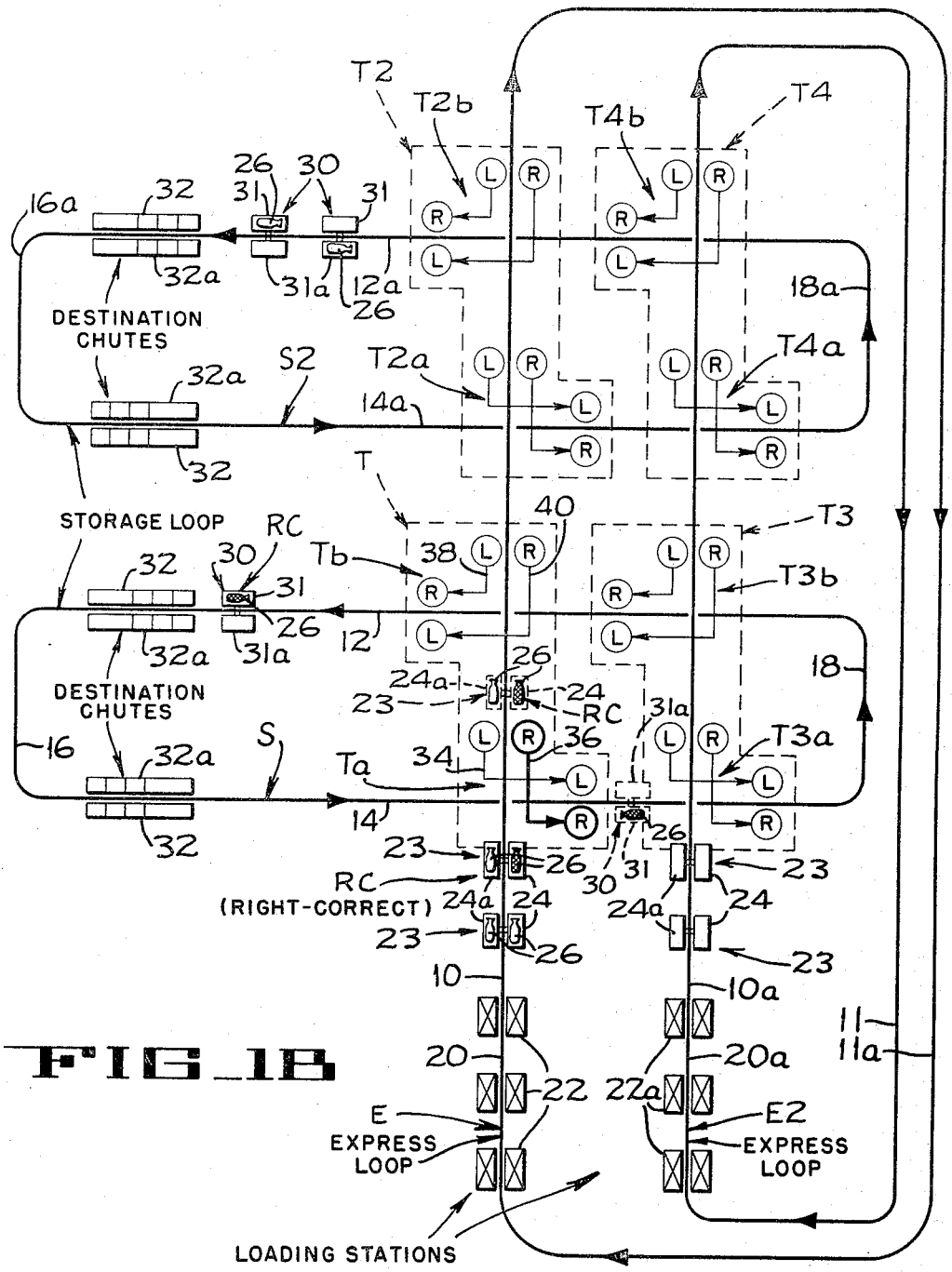

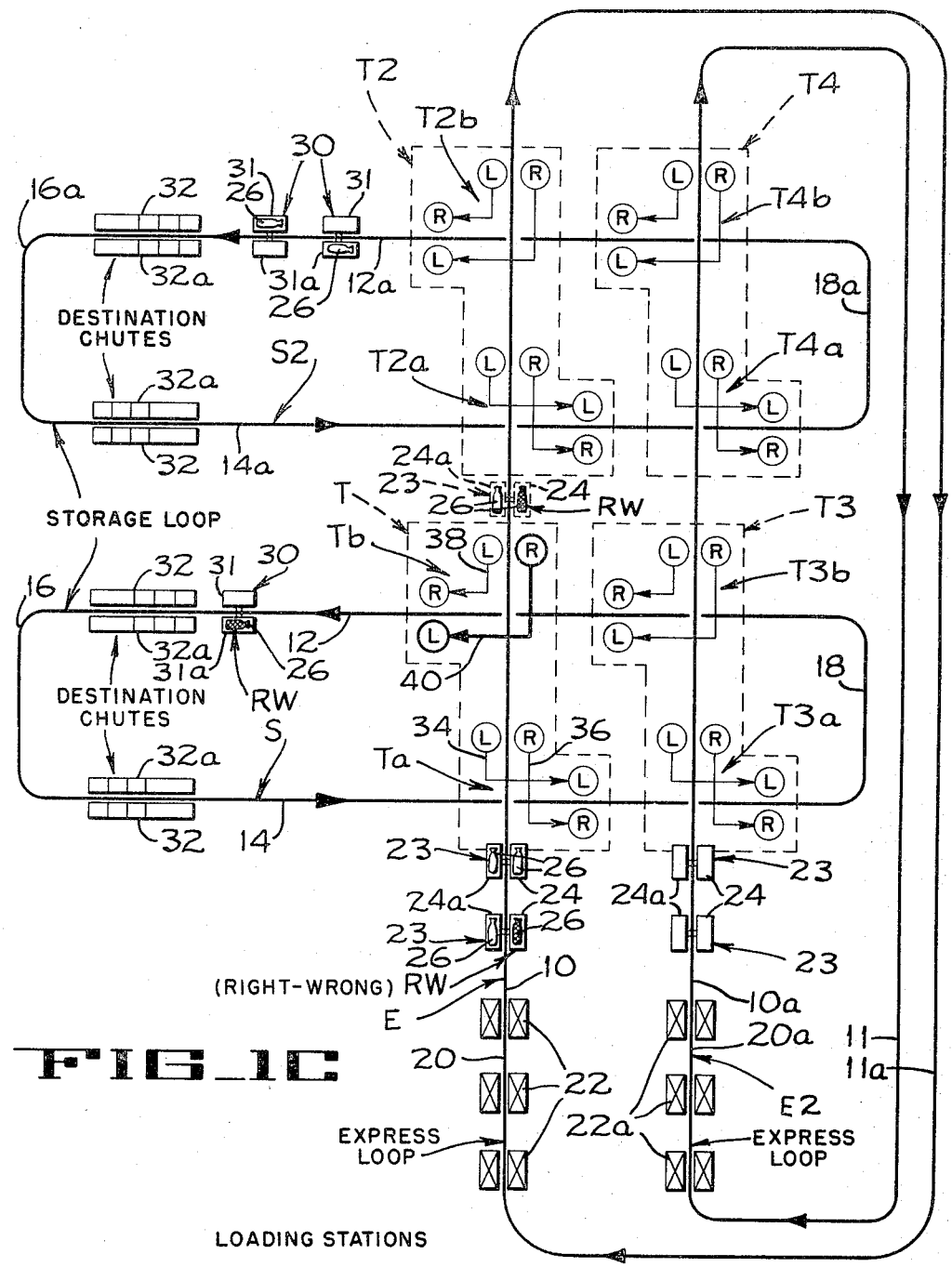

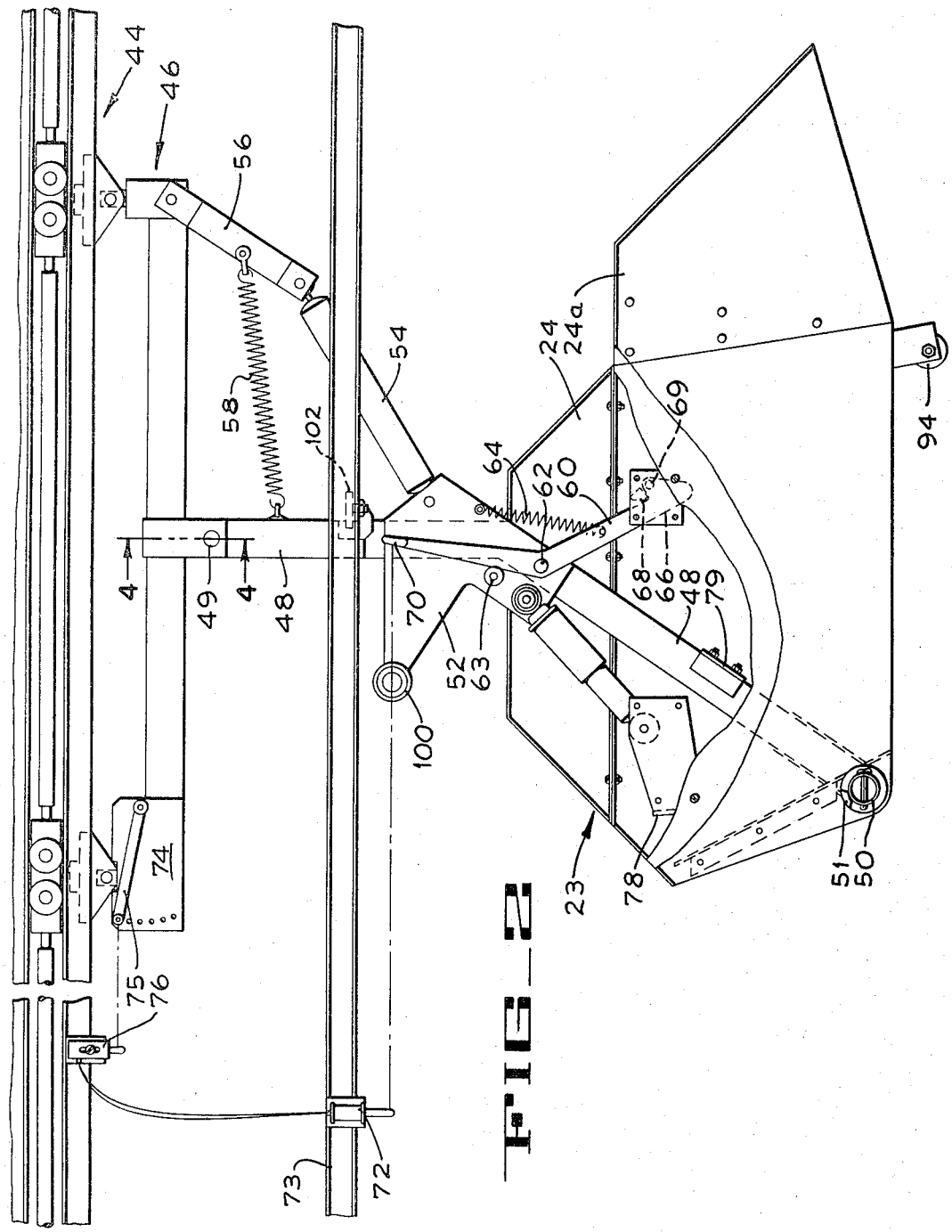

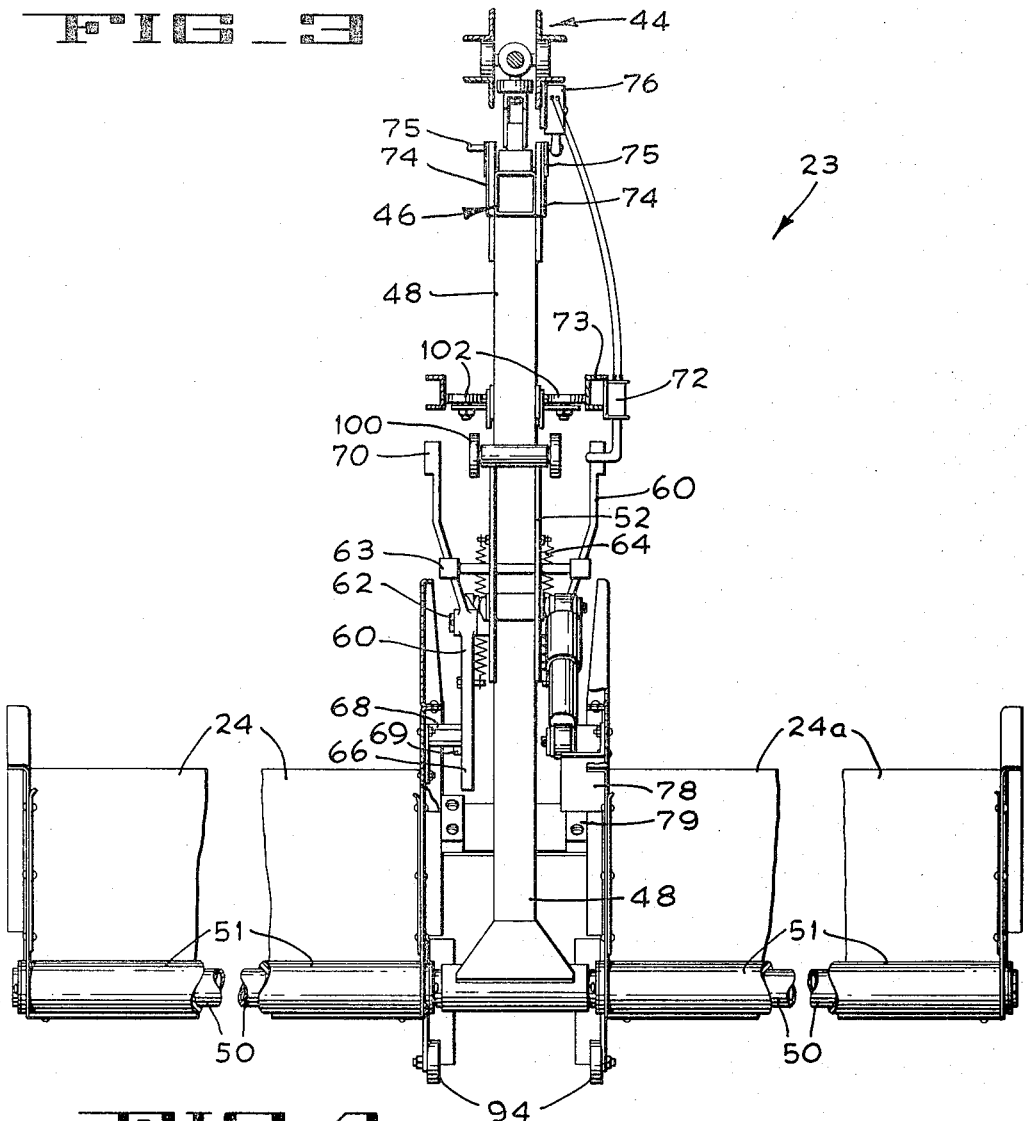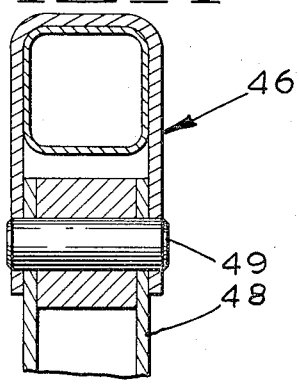

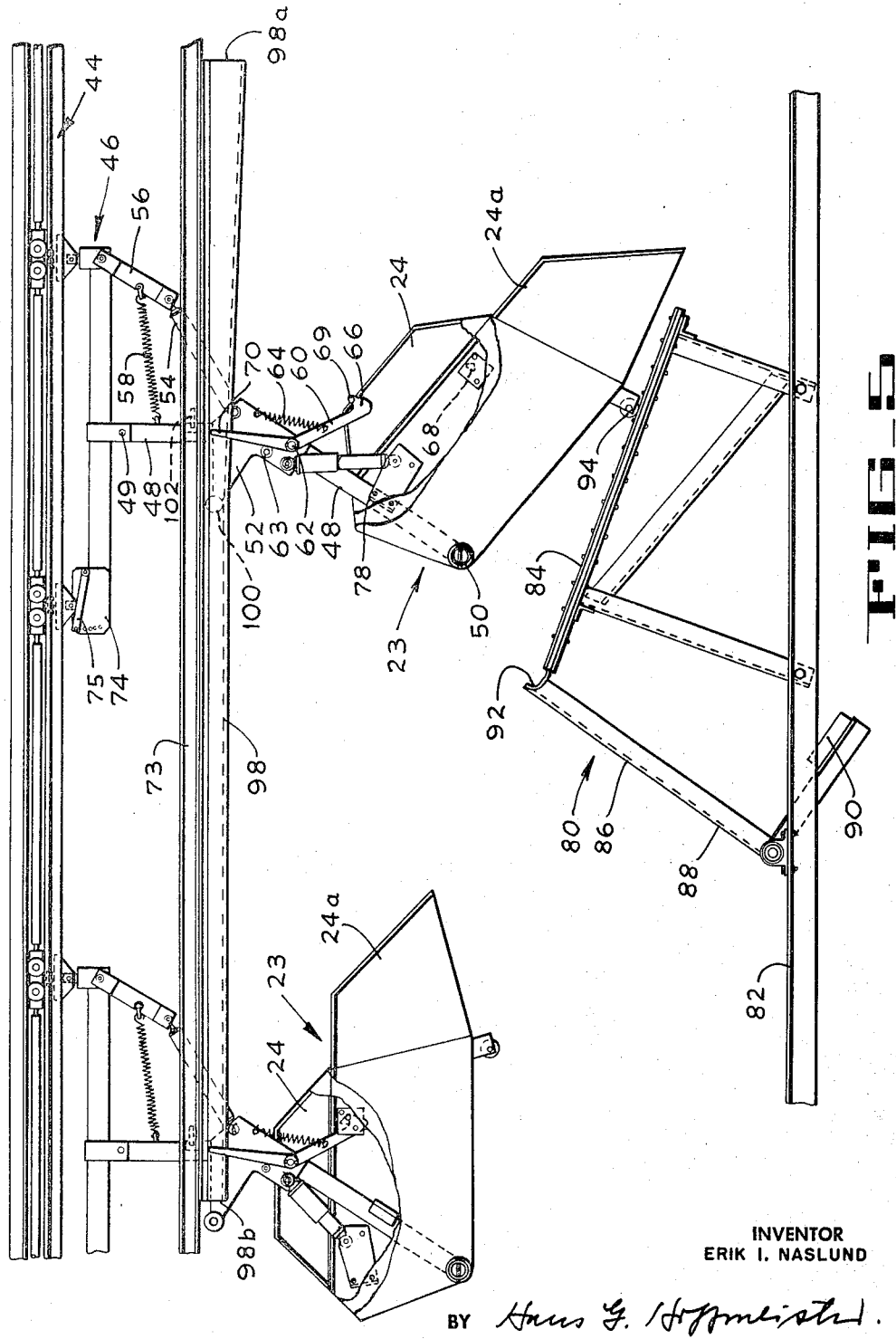

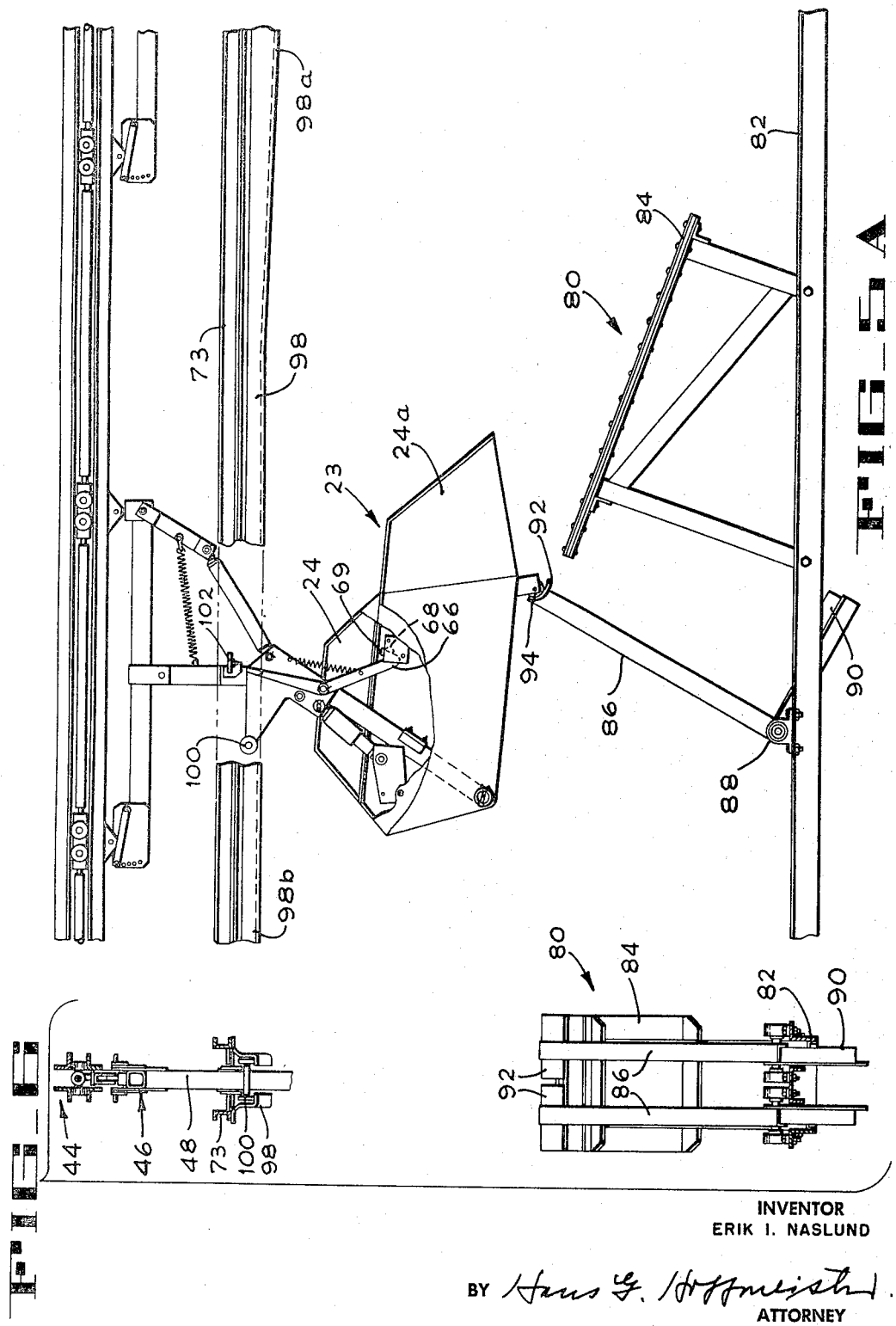

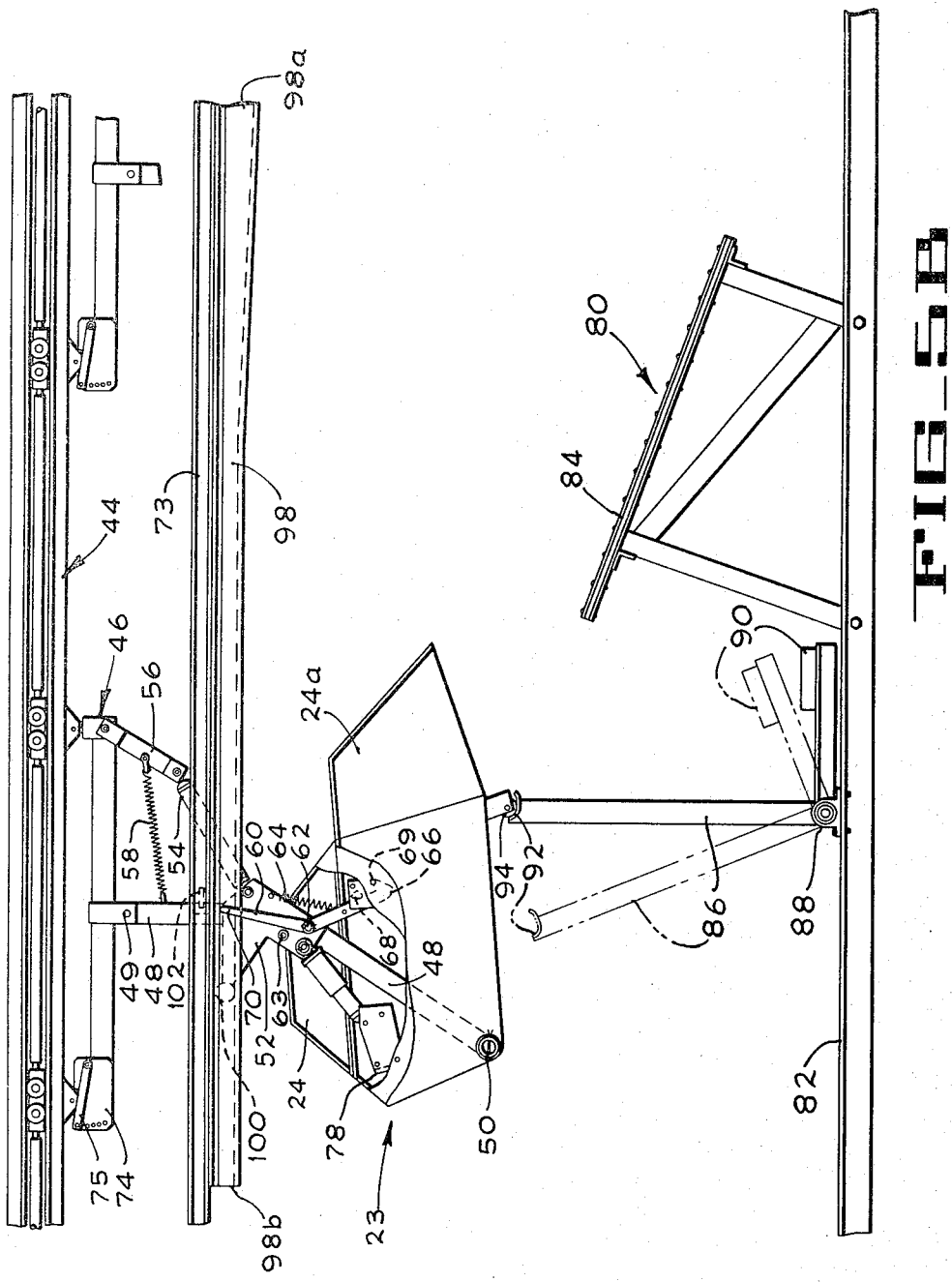

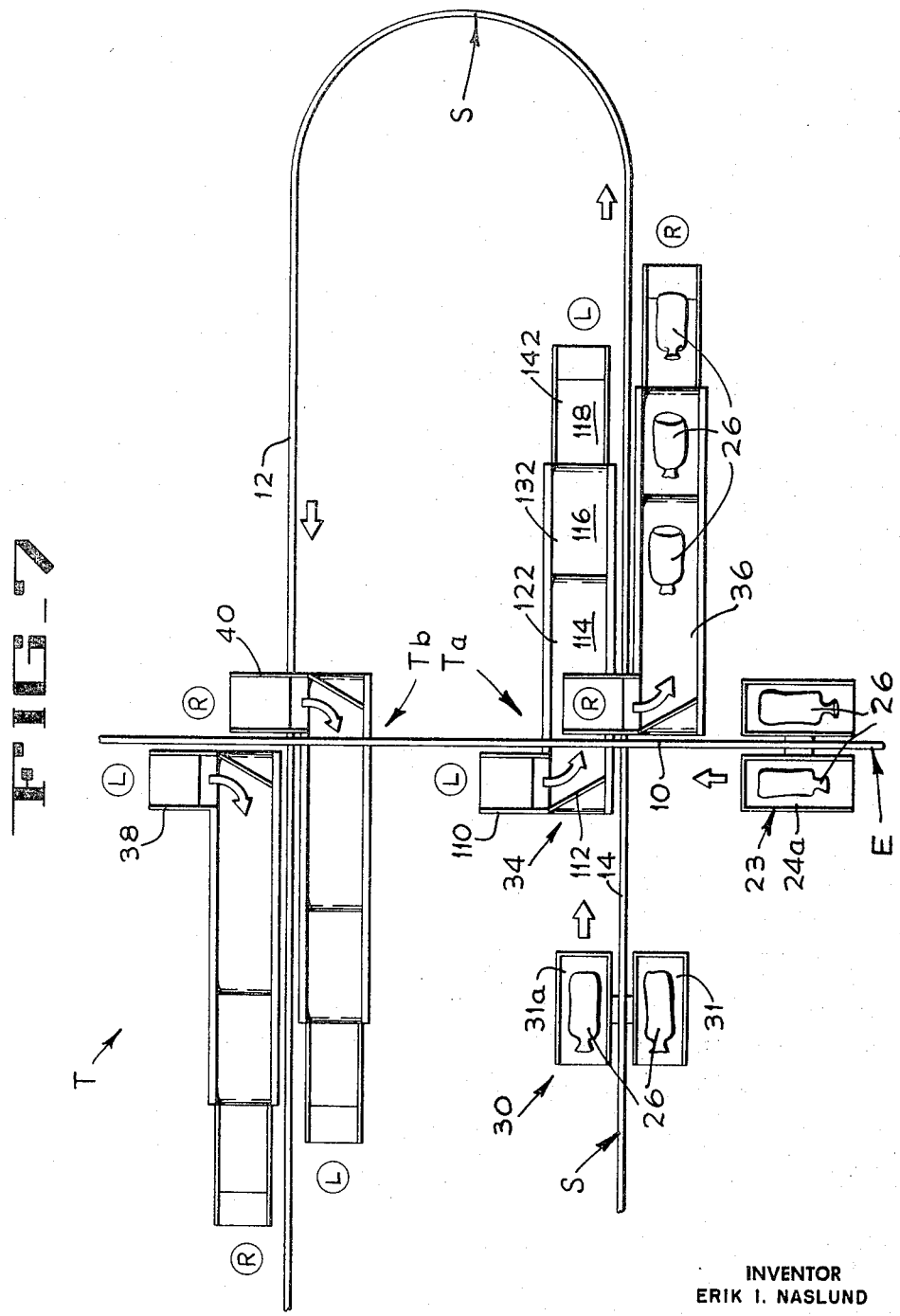

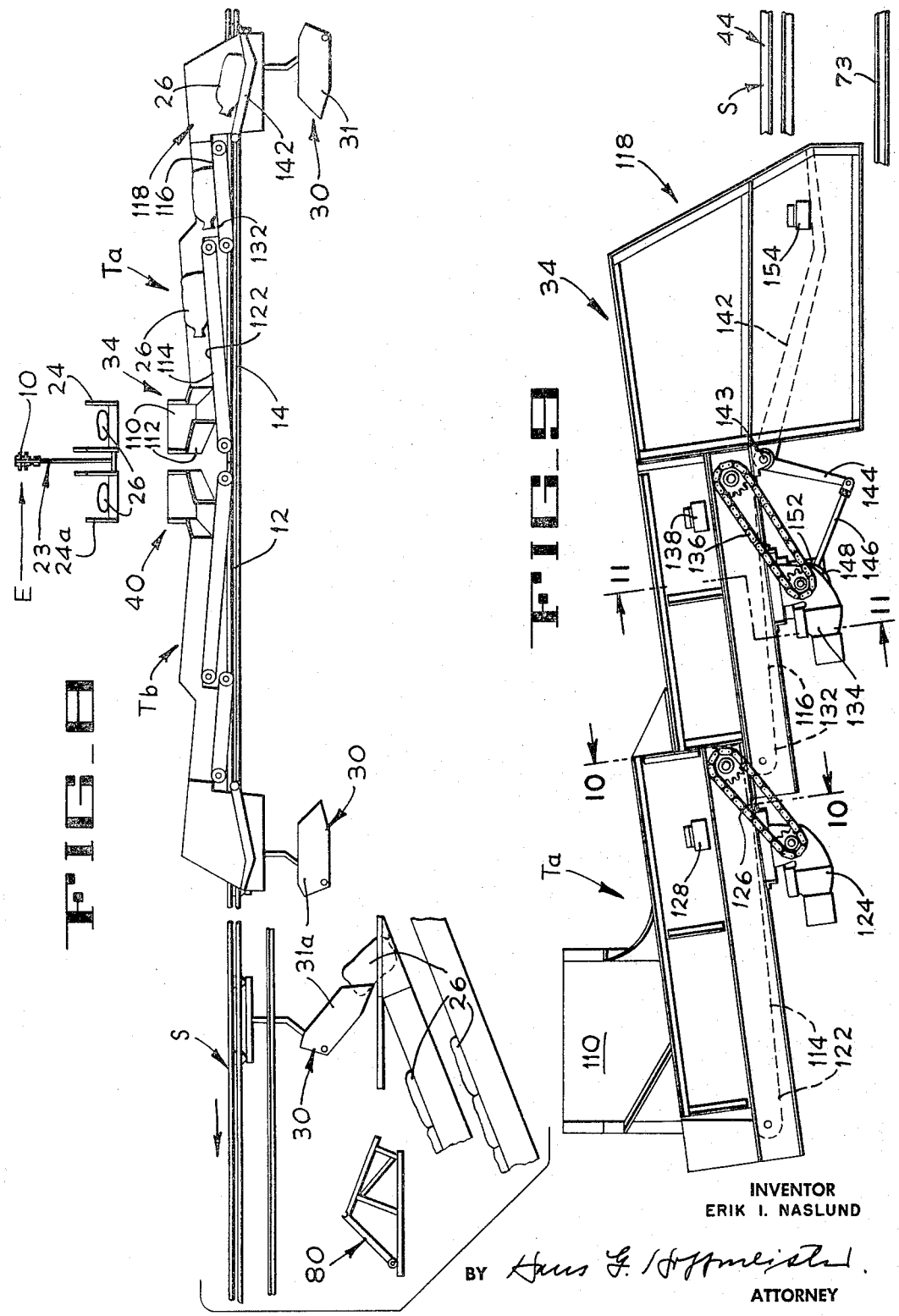

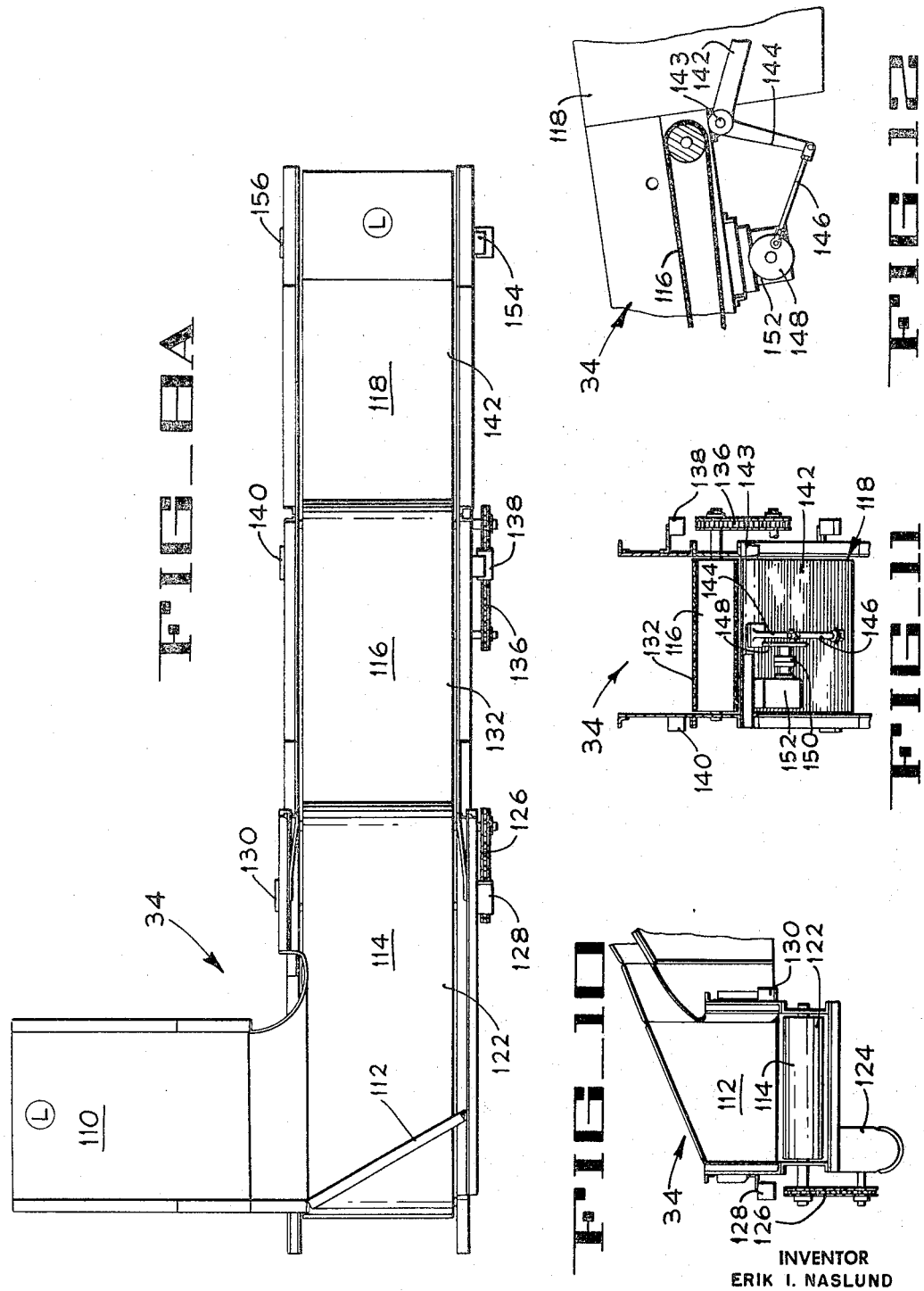

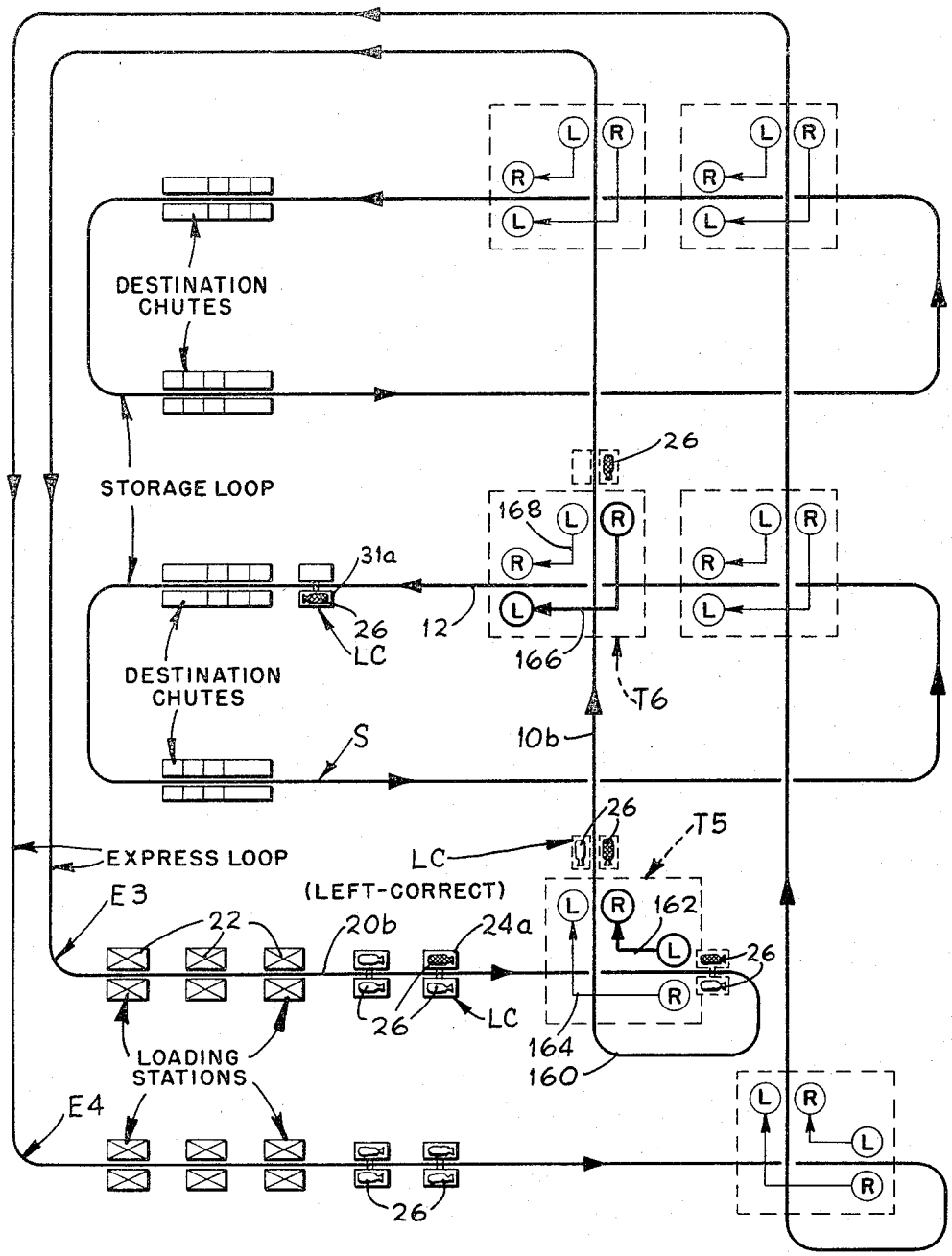

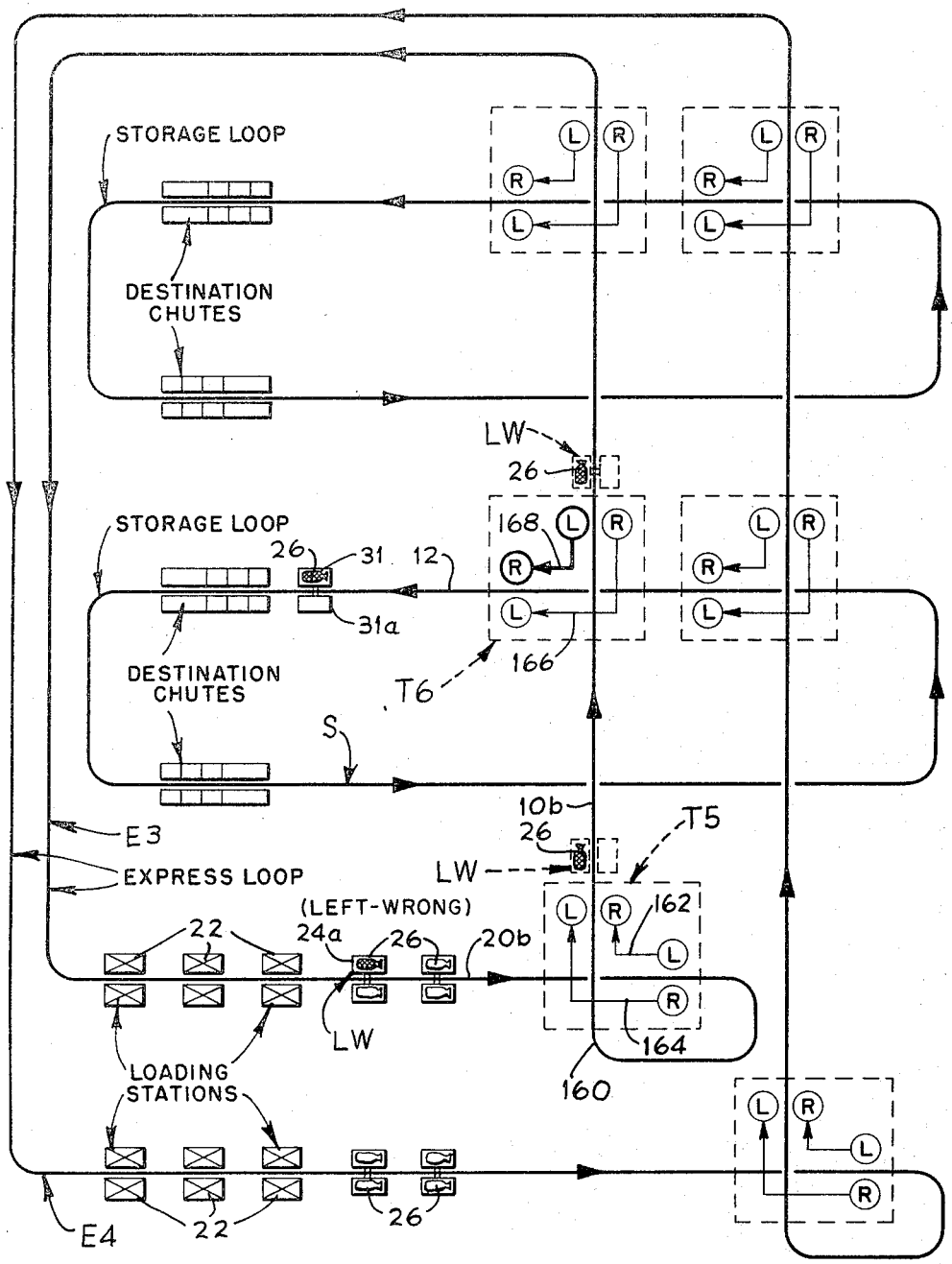
FIG_13A

3,357,539
CONVEYOR SYSTEM
Erik I. Naslund, Santa Clara, Calif., assignor to FMC Corporation, San Jose, Calif., a corporation of Delaware
Continuation of application Ser. No. 351,732, Mar. 13, 1964. This application July 6, 1966, Ser. No. 563,298
14 Claims. (Cl. 198—38)

This application is a continuation of the application of Erik I. Naslund, Ser. No. 351,732, filed Mar. 13, 1964, now abandoned.

This invention relates to material handling, and more particularly to a conveyor interchange system wherein a plurality of main, or express conveyors cross a plurality of secondary, storage, or distributing conveyors, and articles are transferred from the express to the distributing conveyors.

It is an object of the present invention to make possible the indiscriminate loading of articles having a given destination onto either path of a dual path main, or express conveyor, and to provide means for selectively interchanging or transferring articles from either path of the express conveyor, to either of the dual paths of the secondary or distributing conveyor.

Another object of the present invention is to provide an interchange system for selectively transferring articles from carriers in either path of a dual path monorail conveyor to carriers in either path of a dual path intersecting monorail storage or distributing conveyor.

It is also another object of the present invention to provide left to left, left to right, right to right, and right to left transfer or interchange units between intersecting conveyors.

A further object is to provide interchange units of the type described which embody buffer conveyors for temporarily storing articles in case of possible interference at the receiving or distributing secondary conveyor.

It is an object of the present invention to provide a monorail carrier conveyor of the type described which is gravity discharged, and which includes a plow-up device for restoring the individual carriers to their article carrying positions.

Another object of the present invention is to provide a selective dual path conveyor interchange system of the type described which is adaptable to remote or automatic control, but which can also be controlled manually if desired.

Another object of the invention is to provide a complete dual path conveyor interchange system of the type described which minimizes the number of individual transfer or interchange units required.

The manner in which these and other objects of the invention may be obtained by those skilled in the art will be apparent from the following detailed description of the invention, taken with the accompanying drawings.

In the drawings:

FIGURES 1, 1A, 1B and 1C are diagrammatic illustrations of a conveyor interchange system embodying the present invention.

FIGURE 2 is a side elevation of one of the monorail carrier assemblies.

FIGURE 3 is an end elevation of the carrier assembly, with parts broken away.

FIGURE 4 is a section through a carrier mounting pivot pin, taken on lines 4—4 of FIGURE 2.

FIGURE 5 is a side elevation of the carrier plow-up device, showing a carrier on the plow.

FIGURES 5A and 5B show the operation of the plow-up device.

FIGURE 6 is an end elevation of a conveyor at the plow-up device, with parts of a carrier broken away.

FIGURE 7, is an enlarged plan of one of the complete interchanges drawn in simplified form.

FIGURE 8 is a side elevation of the interchange of FIG. 7.

FIGURE 8A is a plan of one of the right angle transfer units.

FIGURE 9 is a side elevation of the unit showing mechanical details not appearing in FIG. 8.

FIGURE 10 is a section taken on lines 10—10 of FIG. 9.

FIGURE 11 is a section on lines 11—11 of FIG. 9.

FIGURE 12 is a side elevation like FIG. 9 showing the crank operating mechanism for the transfer chamber trap door.

FIGURES 13 and 13A are schematic diagrams of a modified embodiment of the invention.

Figure 1A:
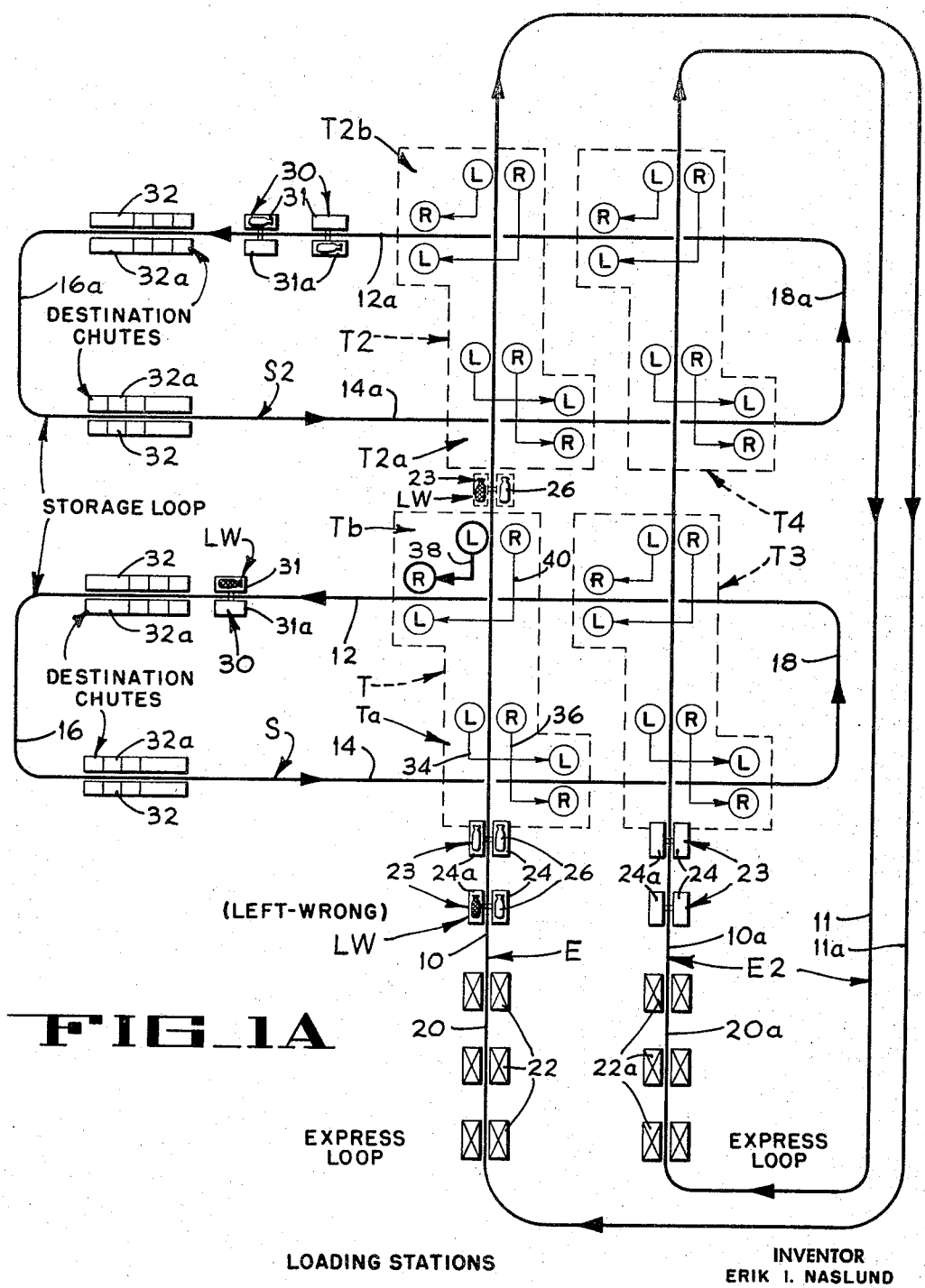

A conveyor system embodying the invention and including two express conveyors and two storage or distributing conveyors appears diagrammatically in FIG. 1, which will first be described in detail in order to indicate the general nature of the invention.

The express conveyors are each in the form of a loop, such as an express loop E, and an express loop E2, as seen in FIG. 1. Although only two express conveyors are indicated in FIG. 1, it is to be understood that any number of such conveyors may be provided. The express loops E and E2 include transfer legs 10 and 10a, respectively, and return loops 11 and 11a. As will be seen presently, in the preferred form of the invention the express loops are dual path monorail conveyors.

Two storage or distributing conveyor loops S and S2 are also illustrated in FIG. 1. These conveyors are likewise dual path conveyors and preferably are of the monorail type to be described in detail presently.

The storage conveyor loops S and S2 have first and second distributing or storage legs indicated at 12 and 14, and 12a and 14a, respectively, as well as return legs 16 and 18 (conveyor S) and 16a and 18a (conveyor S2).

The express conveyors or loops E, E2 include loading legs 20, 20a along each side of which are provided loading stations 22, 22a. The details of the loading stations are not critical to the invention and do not form part thereof. Suffice to say that at each loading station articles having various destinations are loaded indiscriminately onto either path of the associated express conveyor loading leg. At the time of loading, these articles may be coded into a memory system according to their destination, or they may be marked or given selected color codes or the like, indicating their destination.

In the monorail form of the invention being described the express loops E, E2 each carry spaced dual carriers 23 having right and left trays or buckets, 24, 24a. The carriers 23 are all alike, as are the trays, except in each carrier, one tray is designed to operate on the left side or outside of the express loop and the other on the inside thereof. The trays or buckets 24, 24a each carry individual articles, such as mail sacks 26, for distribution to the secondary or storage conveyor loops S, S2.

In the form of the invention shown in FIGS. 1 to 1C, inclusive, the express loop E has a complete transfer or interchange assembly T for the storage loop S, and another complete interchange assembly T2 for the storage loop S2. Similarly, the express loop E2 has complete interchange units or assemblies T3 and T4. These interchange assemblies receive articles from the transfer legs 10 and 10a of the express loops E, E2 for transfer to a selected path on one of the legs 12, 14; 12a, 14a of the storage loops S and S2. In the monorail form of the invention shown diagrammatically in FIG. 1, the storage loops S, S2 also mount a series of spaced dual carriers 30, having right and left hand trays 31, 31a identical with the trays 24, 24a forming part of the express loop carriers 23.

Disposed along the article receiving and distributing legs 12 and 14 and 12a, 14a of the storage loops S, S2 are a right and left multiple destination chute or bins 32, 32a which receive articles from the carriers 30 on the storage loops, according to the destination of the articles. In FIG. 1, chutes or bins 32, 32a are indicated having three downwardly inclined individual destination chutes. However, it is to be understood that the number of chutes for receiving articles can be increased to any desired degree, in correspondence with the required number of destinations or sorts to be provided by the conveyor system of the invention, or the destination volume.

Still referring to FIG. 1, a complete interchange or transfer unit T will now be described generally. The complete interchange T is made up of two sub-interchange units Ta and Tb, the unit Ta provided for interchange between the transfer leg 10 of the express loop E and the receiving leg 14 of the storage loop S. Similarly the sub-transfer unit Tb connects between the transfer leg 10 of the express loop E and the leg 12 of the storage loop S. It will also be seen in FIG. 1, that the corresponding units T2a, T2b; T3a, T3b; and T4a, T4b are provided, and their locations will be obvious from inspection of FIG. 1.

Referring to the sub-transfer unit Ta, this unit includes a left to left (L—L) right angle conveyor 34, and a right to right (R—R) right angle conveyor 36.

The sub-transfer unit Tb includes an L–R unit 38, and an R–L unit 40. The selective operation of a complete interchange, such as interchange T, FIG. 1 will be described after the detailed description of the other elements of the system have been presented.

The elements of the monorail twin carriers 23, 30 essential to the understanding of the embodiment of the invention illustrated and described will now be explained in detail. As mentioned, all the carriers are alike and each carrier mounts one right and one left hand tray. An express loop carrier 23 is selected for detailed description.

Referring to FIGS. 2, 3 and 4, the monorail track, which is of conventional design, is shown at 44, and a double shoe trolley, indicated generally at 46, which is also of conventional design rides along the track. A bent tray or bucket support leg 48 is pivotally suspended from the trolley 46 by a pivot pin 49, shown in detail in FIG. 4. At the lower end of leg 48, a tubular cross rod 50 is mounted and extends transversely for mounting both of the carrier trays or buckets. Each carrier bucket has a sleeve 51 extending across the lower front portion corner, which sleeve is pivotally mounted on the transverse cross rod 50. At the bend in the leg 48, opposed laterally spaced plates 52 are welded, which plates provide for latch and carrier stabilizing connections. A carrier stabilizer piston and cylinder type shock absorber 54, of conventional design, is pivoted at one end to the plate 52 (FIG. 2), and at the other end to a link 56 that is pivotally mounted on one end of the trolley 46. A carrier stabilizer spring 58 extends between the link 56 and the support leg 48. The purpose of the shock absorber and spring assembly just described is to permit the bucket leg 48 to depend vertically from its pivot 49, in sections of the monorail track 44 which are inclined upwardly or downwardly to clear other elements of the system.

Means are provided to latch and unlatch the tray or bucket 24, so that it can fall by gravity about the pivot rod 50, and discharge a mail sack or other article into a selected right angle conveyor (express loops) or into a destination chute (storage loops). In the illustrated embodiment of the invention, a latch lever 60 is pivoted at 62 to the tray support leg 48. The latch is normally held against a stop 63 by means of a spring 64 (FIG. 2). The lower end of the latch lever 60 is provided with a hook or latch portion 66 which provides a detent that supports a laterally extending combined tray support bar and latch cam rod 68, mounted on the tray. A roller 69 on the end portion 66 of the latch cooperates with the cam bar 68 during the latching operation, in a manner to be described presently.

The upper end of the latch lever 60 is formed as a latch-releasing arm 70, which is in the path of a latch-releasing solenoid 72, mounted on a rail 73. The solenoid is energized and projected so as to be struck by the latch-release arm 70, when the carrier reaches a selected destination. As best seen in FIG. 2, an escort memory device 74 of mechanical design is carried by the trolley. The escort memory 74 forms part of the tracking or memory distribution system, in case an automatic control system is provided for the conveyor interchange of the present invention. However, and as mentioned, the control system for the system forms no part of the present invention, because the control can be manual, in case sufficient operators are provided. Briefly, the escort memory unit 74 as illustrated in FIG. 2 is provided with a selectively movable "memory" arm 75, pivoted on the unit. A "write" unit at the loading station (not shown and not forming part of the invention) sets the arm 75 in accordance with the destination. At each destination, a pre-set, vertically adjustable switch 76 is in the path of a pin on the arm 75. When the arm has been set for, and reaches, a selected destination, the pin on arm 75 closes the switch 76, which operates the latch opening solenoid 72, for releasing the article. Cooperating stops 78, 79 limit downward motion of an unlatched tray.

A plow-up device is provided to relatch the trays of the carriers, after they have deposited the articles therein at their selected destination. As seen in FIGS. 5 and 6, the plow-up device, indicated generally at 80, is mounted on a fixed frame 82, and is provided with a ramp 84 for pivoting the buckets up from their release position as the advance along the conveyor. In order to complete the latching operation, a pivoted arm 86 is provided on the forward end of the frame 88, and is normally held in the position shown in FIG. 5, by means of a counterweight 90. The upper or free end of the arm 86 is formed with a hook or pocket 92, for receiving a plow-up roller 94 mounted on the bottom of the tray, after the roller has ridden up on the ramp 84. In order to steady the carrier during the plow-up operation, spaced steadying rails 98 extend over the plow-up area. Vertical stabilizing rollers 100, and horizontal stabilizing rollers 102 are mounted on the carrier assembly, as best seen in FIGS. 2 and 3, for riding in the stabilizing track. The tracks converge vertically from their entry end 98a, to their discharge end 98b, (FIG. 5) so that the vertical carrier rollers 100 readily enter the stabilizing tracks 73. In FIG. 3 the lateral stabilizing rollers 102 are shown engaging the inside flanges of tracks 73, whereas the vertical stabilizing rollers 100 are just entering the tracks, and have not yet been supported by the bottom flanges thereof.

The operation of the plow-up device 80 is as follows: the rollers or wheels 94 on the bottom of the tray first engage the ramp 84, when the tray or bucket which has been dropped to its release position reaches the plow-up device. The ramp gradually lifts the rearward portion of the tray, and after the end of the ramp is reached, wheels 94 are received in the pocket or hook 92, on the pivoted arm 86. As seen in FIG. 5A, continued forward motion of the carrier causes further lifting of the tray 24 by the arm 86. In FIG. 5A, it can be seen how the cam bar 68 engages the latch roller 69, and pivots the latch 60 in a clockwise direction, as indicated in the figure. In FIG. 5B, the carrier is at its maximum elevation because the pivoted arm 86 is now vertical. In this position, the bar 68 is slightly above the detent in the end portion 66 of the latch 60. Further advance of the carrier will cause the end of the arm 86 to drop and permit the bucket to drop slightly under the force of gravity until the bar 68 enters the latch lever detent, with which the tray is completely relatched. This position of the arm is illustrated in phantom in FIG. 5B. After the bucket clears the pivoted arm 86, the counterweight 90 restores the arm to its initial position, as seen in FIG. 5.

A right angle turn conveyor will now be described with sufficient detail to provide an understanding of the invention. The description will refer to the left to left (L—L) unit 34, which transfers articles such as mail sacks between the transfer leg 10 of the express loop E and the leg 14 of the storage loop S. It will be understood that the other right angle turn members previously mentioned are of the same general construction, except that some of the members are right hand units, and the other members are left hand units. Referring to FIGS. 7 to 12, the right angle turn unit 34 includes a sack receiving chute 110 which, as seen in FIG. 8, is mounted beneath a tray on the transfer leg 10 of the express loop E. Leading from the sack receiving chute 110, is a right angle turn chute 112, which conducts the articles to a first buffer conveyor 114. The articles are then successively transported to a second buffer conveyor 116, and onto a transfer chamber 118, which holds the articles until they are ready to be deposited into a carrier tray, such as tray 31a, FIG. 8.

The first buffer conveyor 114 has an intermittently driven conveyor belt 122, which is driven by a remotely controlled drive motor and gear reduction unit 124 (FIGS. 9 and 10) and a chain and sprocket assembly 126. A photoelectric assembly 128, 130 provides for control of the motor 124, that drives the belt 122 of the first buffer conveyor 114.

The second buffer conveyor 116 includes a belt 132 driven by a motor and gear reduction assembly 134 and a chain and sprocket assembly 136 (FIG. 9). The belt of 116 is controlled by photo-electric assembly 138, 140.

The transfer chamber 118 is provided with a hinged trap door 142 at the bottom thereof, and pivoted to the frame at 143 (FIG. 9). Depending from the pivot for the trap door 142 is an operating crank 144, which is pivotally connected to link 146, that is operated by a crank 148 (FIG. 12), and a one revolution clutch 150 (shown diagrammatically in FIG. 11). A motor 152, which is remotely controlled by means not critical to the invention, operates the one revolution clutch 150. The trap door 142 of the transfer chamber is also remotely controlled by photoelectric or sensor means 154, 156 (FIG. 8a).

The buffer construction just described makes possible the storage of a limited number of articles in the right angle turn unit, so that two articles will not be deposited in the same carrier tray on the storage loop conveyor. The control for the buffer is not critical to the invention. All that need be understood is that the photo-electric assemblies controlling the buffer conveyors, and the transfer chamber trap door, sense the presence or absence of articles and provide for a continuous progression of articles through the right angle turn unit. If a discharge signal is provided for the trap door 142 to the transfer chamber, and the underlying carrier contains an article, means not critical to the present invention, lock out the discharge signal or prevent its generation, hence the transfer chamber door does not open until an empty carrier passes underneath the door. A control system suitable for this action is described in the application of Collins et al., Ser. No. 190,889, filed April 30, 1962, and assigned to the assignee of the present invention. Of course, manual signals can be supplied to the trap door motor and clutch assembly by an operator who is observing the condition of the trays in the storage loop.

As mentioned, the details of this control system are not critical to the invention, because the article release elements of the system of the present invention need only be designed for remote control by any conventional means, in which case any one of a number of suitable analog or escort memory systems, coders, read units, write units, etc., can be supplied by those skilled in the art.

The details of the system of FIGURES 1 to 1C of the present invention having been described, operation of the system will now be described relative to these Figures, without reference to the details of the buffer storage conveyors, the right angle turn units, and other mechanical elements, the operation of which will be clearly understood from the previous individual descriptions of these parts.

Referring to FIGURE 1, a mail sack 26 has been loaded in a carrier tray 24a at one of the loading stations 22 of the express loop E. It will be assumed that the article 26 which has been loaded in the left hand tray of a carrier 23 has been loaded in the "correct" loading position, in the sense that it is desired to transfer the article from the left hand path of the express loop E to the left hand path of the storage loop S. Thus, the article 26 (mail sack) in question is designated "left-correct" (LC). Under these conditions, the control system will be such that the LC article will be dropped by the control system into the left-to-left (L—L) right angle turn unit 34, forming part of the sub-interchange unit or assembly Ta, of the complete interchange unit T. Thus, the article is transferred to a carrier tray 31a in the left path of the storage loop S, and hence can be deposited in either of the destination chutes 32 served by that path, namely, the destination chutes 32 in the left path of leg 12 of the storage loop S, or that in the left path of leg 14 of the same storage loop.

Various positions of the article are shown in various stages of the transfer operation in dotted lines, which will be self-explanatory from an examination of the FIGURE 1.

FIGURE 1A shows another article loaded on a tray 24a on the left path of express loop E, but this article is destined for the right path of the storage loop S. This article is indicated as "left-wrong" (LW) in FIG. 1A. Under these circumstances, the left-right (L–R) right angle turn unit 38 of sub-interchange unit Tb will be employed so that the article is transferred to a tray 31 on the right hand path of the storage loop S.

FIGURE 1B shows an article which has been loaded on the right path of the express loop E which is intended for a chute 32 on the right hand path of the storage loop S. Thus, this article is designated "right-correct" (RC). Here, the right-to-right angle turn, unit 36 of unit Ta is set into operation by the control system, so that the article RC is transferred to a tray 31 in the right hand path of storage loop S, as indicated at various stages in the operation in FIGURE 1B.

In FIGURE 1C an article has been loaded on a tray 24 on the right hand path of the express loop E, but this article is designated for the left hand path of the storage loop S. Hence, the article is designated "right-wrong" (RW). Now, the right-left (R–L) right angle turn assembly 40 is employed, forming part of the interchange sub-assembly Tb. Thus, the "RW" article is delivered to a tray 31a on the left hand path of the storage loop S, as required, for depositing in one of the destination chutes along that path.

That system just described has the advantages that the fore and aft orientation of the articles is maintained, which might be of some advantage in cases where post office mail sacks are the articles being handled by the system. However, in this system each storage loop requires a complete interchange system such as T, T2, etc., each of which includes a sub-interchange unit Ta, Tb, etc. The result is that for each leg of an express loop and for each storage loop, four right angle turn assemblies are required.

In the embodiment of the invention shown in FIGS. 13 and 13A, the express loops E3 and E4 have been modified so that only two right angle turn units are required for each storage loop. Referring to FIG. 13, the loading leg 20b of the express loop E3 is loaded indiscriminately from loading station 22, as before. However, the express loop E3, for example, includes a self-crossing article delivery loop 160 upstream of the transfer leg 10b. An interchange T5 is provided at the crossing of the delivery loop 160, which includes a right-left (R–L) right angle turn unit 162, and a left-right (L–R) right angle turn unit 164.

For transferring and interchanging articles to the storage loops such as storage loop S, for example, a complete interchange assembly indicated at T6 now requires but two right angle turn units. These are a right-left (R–L) unit 156 and a left-right (L–R) unit 168, disposed at the intersection of the transfer leg 10b of the express loop E3 and the distribution leg 12 of the storage loop S.

Referring to FIG. 13, an article 26 has been loaded on a tray 24a on the left hand path of the loading leg 20b of express loop. This article is indicated as "left-correct" (LC) because the article is designated for the left hand path of the storage loop S. When this article enters the loop 160, the control causes it to be dropped into the L–R right angle turn unit 162, whereupon it is transferred to the right hand path of the transfer leg 10b of the express loop E3. When the article reaches the transfer or interchange unit T6 between the express and storage conveyor, the control causes the article to be dropped into the right angle turn unit 166 which is an R–L unit, and the article is, therefore, transferred to a tray 31a in the left hand path of leg 12 of the storage loop S, as originally intended.

FIGURE 13A shows an article 26 which has been deposited in a tray 24a on the left hand path of express loop E3, but is destined for the right hand path of the storage loop S, and hence is designated "left-wrong" (LW). This article passes around the delivery loop 160 without going through either of the right angle turn units of interchange T5. However, when the article reaches the interchange T6 at the storage loop S, it is deposited into the L–R right angle turn unit 168 which places it in a tray 31 on the right hand path of the storage loop S, as intended. The other two possibilities of indiscriminate loading of the express loops for transfer to the designated paths on the storage loops will be obvious from the previous examples, and need not be described in detail.

It will be apparent that the invention provides a simple means for transferring an article from either path of one dual conveyor to either path of an intersecting dual conveyor, under remote control if desired, although manual control is also possible. Also, a simple dual path monorail conveyor system is provided in the preferred embodiment of the invention.

Having completed a detailed description of the present invention so that those skilled in the art can practice the same, I claim:

1. A conveyor system comprising an endless dual path express conveyor, an endless dual path distributing conveyor having first and second dual path legs crossing a dual path leg of said express conveyor, said first and second dual path legs moving in opposite directions, and means for selectively transferring articles from either path of said express conveyor leg to either path of said distributing conveyor legs.

2. A conveyor system comprising an endless dual path express conveyor, an endless dual path distributing conveyor having first and second dual path legs crossing a dual path leg of said express conveyor, said first and second dual path legs moving in opposite directions, means for selectively transferring articles from the left path of said express conveyor leg to the left path of the first leg of said distributing conveyor, from the right path of said express conveyor leg to the right path of the second leg of said distrbuting conveyor, from the right path of said express conveyor leg to the right path of the first leg of said distributing conveyor, and from the right path of said express conveyor leg to the left path of the second leg of said distributing conveyor.

3. A conveyor system comprising an endless dual path express conveyor having a loading leg, a transfer leg, an article delivery loop connecting said legs so that said loading leg and said transfer leg cross, one above the other, and a return loop connecting said transfer leg to said loading leg; means adjacent the crossing of said legs and said article delivery loop for transferring articles from either path of one of said legs to the opposite path of the other leg; an endless distributing conveyor having a dual path leg crossing the transfer leg of said express conveyor, and means adjacent said latter crossing for transferring articles from either path of said express conveyor leg to the opposite path of said dual path distributor conveyor leg.

4. A conveyor interchange system comprising a dual path express monorail conveyor including paired carriers, a plurality of dual path distributing monorail conveyors including paired carriers, all of said carriers including article unloading means, said distributing conveyors each including a pair of legs crossing said express conveyor below the latter with the legs in each distributing conveyor moving in opposite directions and means for selectively transferring articles from a carrier in either path of said express conveyor to a carrier in either path of the legs of said distributing conveyors.

5. A conveyor system comprising an endless monorail express conveyor having paired carriers including an article releasing means, said express conveyor having a loading leg, a transfer leg, and a return loop connecting said transfer leg to said loading leg; an endless distributing conveyor having paired carriers including article releasing means, said distributing conveyor having first and second legs crossing beneath the transfer leg of said express conveyor, a pair of angle turn conveyors between the crossing of said first distributor leg and said express conveyor transfer leg for transferring articles released from the carriers in either path of said express conveyor transfer leg to those in the corresponding path of said first distributor leg, and a pair of angle turn conveyors between the crossing of said second distributor leg and said express conveyor transfer leg for transferring articles released from the carriers in either path of said express conveyor transfer leg to those in the opposite path of said second distributor conveyor leg.

6. A conveyor system comprising an endless monorail express conveyor having paired carriers including article releasing means, said express conveyor having a loading leg, a transfer leg, an article delivery loop connecting said legs so that the latter cross, one above the other, and a return loop connecting said transfer leg to said loading leg, a pair of angle turn conveyors between the crossing legs of said article delivery loop for transferring articles from the carriers in either path of one of said legs to those in the opposite path of the other leg; an endless distributing conveyor having paired carriers including article unloading means, said distributing conveyor having a leg crossing beneath the transfer leg of said express conveyor, and a pair of angle turn conveyors between the crossing of said latter legs for transferring articles released from the carriers in either path of said express conveyor leg to those in the opposite path of said dual path distributor conveyor leg.

7. A conveyor system comprising an endless monorail express conveyor having paired carriers including article releasing means, said express conveyor having a loading leg, a transfer leg, and a return loop connecting said transfer leg to said loading leg; an endless distributing conveyor having paired carriers including article releasing means, said distributing conveyor having first and second legs crossing beneath the transfer leg of said express conveyor, a pair of angle turn conveyors between the crossing of said first distributor leg and said express conveyor transfer leg for transferring articles released from the carrier in either path of said express conveyor transfer leg to those in the corresponding path of said first distributor conveyor leg, and a pair of angle turn conveyors between the crossing of said second distributor leg and said express conveyor transfer leg for transferring articles released from the carriers in either path of said express conveyor transfer leg to those in the opposite path of said second distributor conveyor leg, each of said angle turn conveyors comprising a plurality of sequentially operable buffer conveyors for individual articles, a transfer chamber for receiving articles from the last buffer conveyor, and a trap door in the bottom of each transfer chamber.

8. A conveyor system comprising an endless monorail express conveyor having paired carriers including article releasing means, said express conveyor having a loading leg, a transfer leg, an article delivery loop connecting said legs so that the latter cross, one above the other, and a return loop connecting said transfer leg to said loading leg; a pair of angle turn conveyors between the crossing legs of said article delivery loop for transferring articles from the carriers in either path of one of said legs to those in the opposite path of the other leg; an endless distributing conveyor having paired carriers including article unloading means, said distributing conveyor having a leg crossing beneath the transfer leg of said express conveyor, a pair of angle turn conveyors between the crossing of said latter legs for transferring articles released from the carriers in either path of said express conveyor leg to those in the opposite path of said dual path distributor conveyor leg, each of said angle turn conveyors comprising a plurality of sequentially operable buffer conveyors for individual articles, a transfer chamber for receiving articles from the last buffer conveyor, and a trap door in the bottom of each transfer chamber.

9. A monorail conveyor comprising a track, a trolley in said track a leg depending from said trolley, a bucket pivotally mounted on said leg adjacent the forward end of the bucket, a self-cocking latch between said leg and said bucket; a bucket plow-up device beneath said track, said plow-up device comprising a bucket lifting ramp and a pivoted arm forward of the ramp, said pivoted arm being normally inclined rearwardly, and means on said bucket rearward of the bucket pivot for engaging a free end portion of said pivoted arm, continued forward motion of said bucket causing said pivoted arm to further lift said bucket about its pivot causing engagement of said latch.

10. The conveyor of claim 9, wherein generally horizontal stabilizing tracks are mounted above said plow-up device, and vertical leg stabilizer rollers are mounted on said bucket support leg for engaging said tracks.

11. A conveyor system comprising an endless dual path express conveyor, an endless dual path distributing conveyor having a dual path leg crossing a dual path leg of said express conveyor at an angle, and transfer means for selectively transferring moving articles from either path of said express conveyor leg to either path of said distributing conveyor leg, said transfer means comprising article guide means for changing the direction of motion of the articles by an angle substantially equal to said conveyor crossing angle while maintaining the fore and aft orientation of the articles with their line of motion during the transfer.

12. A conveyor system comprising an express conveyor, a distributing conveyor having a leg crossing beneath a leg of said express conveyor, and a transfer conveyor at said crossing and disposed vertically between said conveyors for transferring articles from said express to said distributor conveyor legs; said transfer conveyor comprising an angle turn conveyor having article guide means for changing the direction of motion of the articles through an angle substantially equal to the angle between said conveyor legs while maintaining the fore and aft orientation of each article with its line of motion during transfer.

13. A conveyor system comprising an overhead conveyor, a carrier running along said conveyor including an article conveying tray, means for pivotally supporting the leading end of said tray from said carrier, means for releasing articles from the trailing end of said carrier, means for latching said tray in an article conveying position generally parallel to the conveyor, means for releasing said tray for pivoting to a release position with the trailing end of the tray lowered, and a downwardly inclined article receiving chute having a portion that underlies and extends generally in the vertical plane of said conveyor, said chute inclining downwardly from said conveyor in a direction opposite to the direction of motion of said carrier, for non-tumbling article transfer.

14. A conveyor system comprising upper and lower monorail conveyors having intersecting legs, article carriers running along said conveyors, the carriers on said upper conveyor comprising an article conveying tray, means for releasing articles from the trailing end of the tray, and a right angle transfer conveyor between said conveyor legs, said transfer conveyor comprising an article receiving chute beneath and generally in the vertical plane of said upper conveyor and an article delivery portion above and generally parallel to said lower conveyor, said article receiving chute being inclined downwardly from said upper conveyor in a direction opposite to the direction of carrier motion for smooth, non-tumbling article transfer.

References Cited

UNITED STATES PATENTS

| | | | |
|---|---|---|---|
| 748,576 | 1/1904 | Bivert | 198—145 |
| 1,986,420 | 1/1935 | Webb et al. | 198—38 |
| 2,758,698 | 8/1956 | Freeman | 198—38 |
| 2,765,067 | 10/1956 | Andrews et al. | 198—147 |
| 2,776,043 | 1/1957 | Spillers | 198—177 |
| 2,936,875 | 5/1960 | Von Kritter | 198—155 |
| 3,100,040 | 8/1963 | Kleist | 198—38 |

EDWARD A. SROKA, *Primary Examiner.*

EVON C. BLUNK, *Examiner.*

A. C. HODGSON, *Assistant Examiner.*

UNITED STATES PATENT OFFICE
CERTIFICATE OF CORRECTION

Patent No. 3,357,539                            December 12, 1967

Erik I. Naslund

It is certified that error appears in the above identified patent and that said Letters Patent are hereby corrected as shown below:

Column 7, line 64, "right" should read -- left --. Column 8, line 34, after "distributor" insert -- conveyor --. Column 9, line 40, after "pivot" insert -- for --; line 44, after "vertical" insert -- and lateral --.

Signed and sealed this 24th day of February 1970.

(SEAL)
Attest:

Edward M. Fletcher, Jr.                        WILLIAM E. SCHUYLER, JR.
Attesting Officer                                       Commissioner of Patents